United States Patent [19]

Bonicel

[11] Patent Number: 4,701,014

[45] Date of Patent: Oct. 20, 1987

[54] CONNECTION BETWEEN AN OPTICAL FIBER CABLE AND A JUNCTION BOX, AND A METHOD OF MAKING THE CONNECTION

[75] Inventor: Jean-Pierre Bonicel, Lyons, France

[73] Assignee: Les Cables de Lyon, Clichy, France

[21] Appl. No.: 799,662

[22] Filed: Nov. 18, 1985

[30] Foreign Application Priority Data

Nov. 16, 1984 [FR] France ................................ 84 17532

[51] Int. Cl.$^4$ ............................................... H02B 6/36
[52] U.S. Cl. ..................................... 350/96.20; 174/76
[58] Field of Search ............. 174/76; 350/96.20, 96.23

[56] References Cited

U.S. PATENT DOCUMENTS 4,516,830  5/1985  Guazzo ............................. 350/96.22
4,601,536  7/1986  Guazzo ............................. 350/96.20
4,621,168  11/1986  Bryant et al. ...................... 174/76 X Primary Examiner—Eugene R. LaRoche
Assistant Examiner—James C. Lee
Attorney, Agent, or Firm—Sughrue, Mion, Zinn, Macpeak, and Seas

[57] ABSTRACT

A connection between a junction box and an optical fiber cable having an axial strength member, said strength member being constituted by braided fibers or by a composite material including fibers, e.g. a guard cable for a high tension line. The fibers of the axial strength member (2) are splayed out into a tuft (4) at the end (3) of the cable and are held fast in a cold-polymerized resin (5) which fills a cavity in a receptacle (6) which is fixed to said box.

3 Claims, 1 Drawing Figure

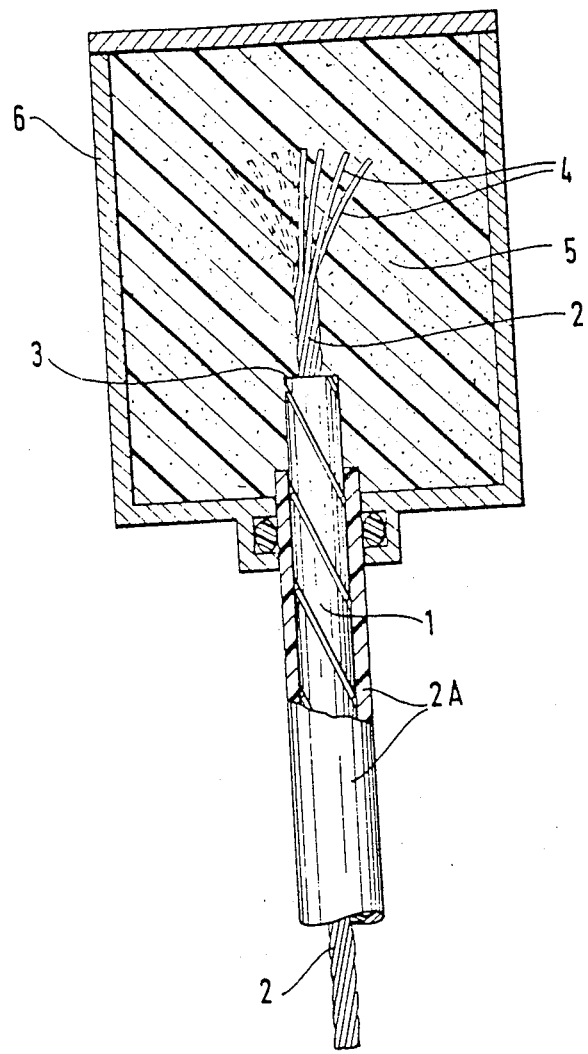

CONNECTION BETWEEN AN OPTICAL FIBER CABLE AND A JUNCTION BOX, AND A METHOD OF MAKING THE CONNECTION

The present invention relates to a connection between a junction box and an optical fiber cable including an axial strength member comprising a braid of fibers or a composite material including fibers, in particular guard cables for high tension lines.

The invention also covers a method of making a connection.

BACKGROUND OF THE INVENTION

The Applicants' published French patent application number 2 524 986 has already described a connection between the ends of two submerged optical fiber cables, each cable comprising an optical fiber core then a helically wound arch of steel wires, a copper tube swaged down on the arch, an insulating sheet, a return conductor, and a protective sheet, said connection comprising at each cable end: a fixing part; a conical wedge for splaying out the arch-forming steel wires, and a hardenable synthetic resin plug in which the ends of the steel wires are glued, jammed between the fixing parts and the conical wedges.

However, such a connection is relatively complex and is not suitable for connecting a cable having an axial strength member which is non-metallic, in particular for connecting guard cables of tubular structure or having a central core fitted with grooves for receiving optical fibers to an axial strength member of composite material (glass fibers/epoxy resin, glass fibers/polyester resin, aromatic polyamide fibers/polyester resin) or of high strength braided non-metallic fibers (e.g. carbon fibers). The ends of such cables must be firmly held in connection boxes and must be capable of supporting traction corresponding to an elongation of at least 0.8% without breaking or sliping.

Preferred implementations of the present invention provide a connection which firmly retains the end of the cable in the box, and enables said end to withstand traction corresponding to an elongation of at least 0.8% without breaking or sliping, said connection being of simple structure and easy to make.

SUMMARY OF THE INVENTION

The present invention provides a connection between a junction box and an optical fiber cable having an axial strength member comprising a braid of fibers or a composite material including fibers, the connection comprising the improvement whereby the fibers of the composite material or of the braid are splayed out at the end of the axial strength member into a tuft and are held fast in a cold-polymerized resin which fills a cavity in a receptacle which is fixed to said box.

The invention also provides a method of making a connection as defined above with a cable having an axial strength member comprising a composite material including glass fibers, wherein the end of the axial strength member is burned so as to separate the glass fibers and to cause them to splay out into a tuft, wherein the tuft of glass fibers is then immersed in cold-polymerizable resin which fills the cavity in the receptacle, and wherein the resin is allowed to polymerize.

The invention also provides a method of making a connection as defined above for a cable having an axial strength member comprising a fiber braid, wherein the fibers at the end of the braid are splayed out so as to form a tuft, wherein the tuft of fibers is then immersed in a cold-polymerizable resin which fills the cavity in the receptacle, and wherein the resin is allowed to polymerize.

BRIEF DESCRIPTION OF THE DRAWING

An implementation of the invention is described by way of example with reference to the sole FIGURE of the accompanying drawing which is a partial section through a connection between a junction box and a guard cable for a high tension line, the guard table having a grooved central rod of plastic material and a composite strength member made of glass fibers and epoxy resin.

MORE DETAILED DESCRIPTION

A central rod 1 has an axial strength member 2, a sheath 2A, and ends at a point 3. The axial strength member has a diameter of about 0.5 mm to 2 mm and is made of glass fibers having a diameter of about 20 microns, which fibers are twisted together and coated with epoxy resin, such that the glass constitutes 70% by weight of the glass/resin composite. The strength member extends beyond the point 3 over a length of about 50 mm. Thereafter, the glass fibers splay out in the form of a tuft 4 having a length of 25 mm to 30 mm. The tuft is immersed in a mass of epoxy resin 5 which is disposed in the cavity in a receptacle 6 which is fixed to the junction box (not shown). The optical fibers (not shown) of the cable are connected to fibers coming from the end of another cable in another cavity within the connection box in a conventional manner which ensures that there is excess length of glass fiber, e.g. in the manner described in published French patent application 2 524 986 or in the corresponding U.S. Pat. No. 4,595,256, filed Apr. 5, 1983.

The glass fibers of the composite material in the rod strength member are separated from the epoxy and splayed out by burning the end of the rod. This also serves to remove the textile lubricant which the glass fibers may still have thereon, and thus improves bonding with the cold-polymerizable resin, e.g. an epoxy resin.

Strength tests have been performed on a rod made of plastic material and having an axial strength member made of a glass fiber/resin composite material. The rod was disposed vertically and each end was connected by splaying out the glass fibers in a plug of cold-polymerized epoxy resin disposed in a junction box. The lower junction box was subjected to traction causing the rod to lengthen by 1%. No breakage and no sliping were observed at the end of an eight month observation period.

Strength tests have also been performed on the strength member with one end fixed in a junction box. The strength member broke at an extension of about 5%, thereby showing that the tractive strength of the assembled strength member and junction box is not less than the strength of the strength member on its own. This strength corresponds to a force of 400 kg to break a rod having a diameter of 2 mm and to 285 kg to break a rod having a diameter of 1.2 mm.

I claim:

1. In a connection between a junction box for an optical fiber cable and an axial strength member, said strength member constituted by one of braided fibers and a composite material including fibers, the improvement comprising the fibers of the axial strength member being splayed out at the end thereof into a tuft of fibers and a receptacle fixed to said box and a cold-polymerized resin filling a cavity in said receptacle about said tuft and embedding said tuft of fibers.

2. A method of making a connection with a cable having an axial strength member constituted by a composite material including glass fibers, said method comprising the steps of:
- burning the end of the axial strength member so as to separate the glass fibers and to cause them to splay out into a tuft of glass fibers;
- immersing the tuft of glass fibers in cold-polymerizable resin by filling a cavity in a receptacle bearing said tuft of glass fibers with said resin; and
- causing the resin to polymerize.

3. A method of making a connection, with a cable having an axial strength member constituted by braided fibers, said method comprising the steps of:
- splaying the fibers at the end of the braid out so as to form a tuft of fibers;
- immersing the tuft of fibers in a cold-polymerizable resin by filling a cavity in a receptacle bearing said tuft of fibers with said resin; and
- causing the resin to polymerize.

* * * * *